June 14, 1955 J. T. BANGERT 2,710,944

INTERSTAGE COUPLING NETWORK

Filed Sept. 1, 1953

INVENTOR
J. T. BANGERT
BY Hugh S. Wertz
ATTORNEY 2,710,944
Patented June 14, 1955

2,710,944

INTERSTAGE COUPLING NETWORK

John T. Bangert, Summit, N. J., assignor to Bell Telephone Laboratories, Incorporated, New York, N. Y., a corporation of New York Application September 1, 1953, Serial No. 377,807

6 Claims. (Cl. 333—32)

Figure 1:
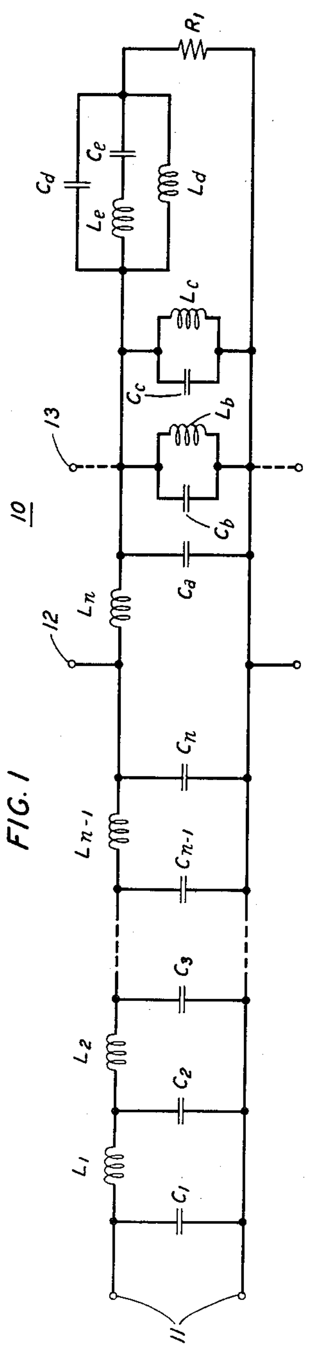

This invention relates to coupling networks and more particularly to coupling networks for use as interstage coupling networks in broad band amplifiers.

In a copending application Serial No. 317,815 filed September 1, 1953, by J. R. Pierce there is described a coupling network which facilitates the problem of coupling from the output of one stage of a multistage amplifier to the input of the succeeding stage of the amplifier when the ratio of the input capacitance of the succeeding stage to the output capacitance of the preceding stage is several times unity. To this end, the Pierce application describes a four-terminal coupling network which comprises a ladder-type network with series inductances and shunt capacitances which are exponentially tapered, or in constant ratio $a$ from section to section, the shunt capacitances increasing at the rate $1/a$ and forming the first and last elements of the ladder, and the intervening series inductances decreasing at the rate $a$, and a two-terminal terminating network for the ladder which simulates an infinite continuation of the ladder. Moreover, to correct for the impedance mismatch, at the output and input circuits to be coupled by the interstage network the output and input shunt capacitances, respectively, form the full shunt capacitances of the first and last shunt arms of the ladder network.

The object of the present invention is to provide an improved two-terminal network which simulates impedancewise an infinite continuation of an exponentially tapered ladder of shunt capacitances and series inductances of the kind described.

A related object is to provide a coupling network which provides a constant transfer impedance when operating between a large capacitance mismatch.

Another more specific object is to provide an improved interstage coupling network for incorporation in a multistage amplifier in which the ratio of the input capacitance of one stage to the output capacitance of its preceding stage is high.

To this end, a feature of the invention is a terminating network for an exponentially tapered ladder network of the kind described which terminating network includes a series combination of an inductance decreased by the constant $a$ from the last series inductance of the exponentially tapered ladder and a two-terminal impedance branch comprising a plurality of branch arms. In a specific embodiment to be described in detail, the two-terminal impedance branch has an impedance characteristic corresponding to that of a parallel combination of a branch arm having a capacitance $1/2a$ times that of the last shunt capacitance of the tapered ladder, a branch arm having an inductance $$\frac{2a^2}{1-a}$$

times that of the last series inductance of the tapered ladder, and a branch arm comprising an $m$-type shunt derived half section with its terminating resistance substantially equal to $a^{3/2}$ times the impedance of the last series inductance at the resonant frequency of the tapered ladder line.

Figure 2:
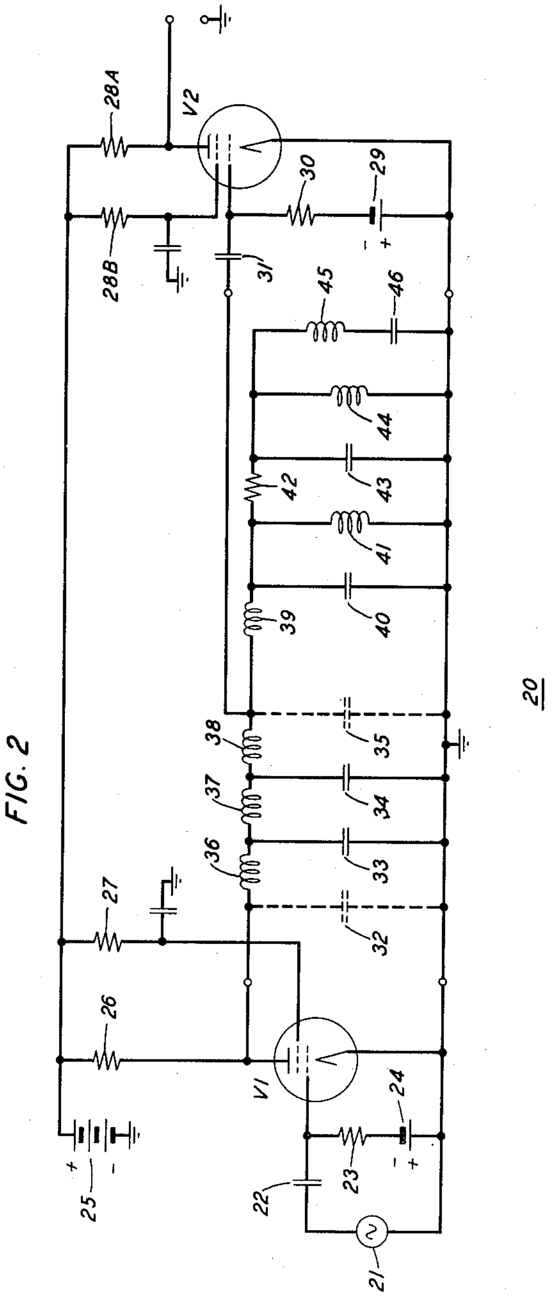

The invention will be better understood from the following more detailed description taken in conjunction with the accompanying drawings in which:

Fig. 1 shows in expanded form an illustrative embodiment of a four-terminal network in accordance with the invention; and Fig. 2 shows a two stage amplifier in which the four-terminal network shown in Fig. 1 is lumped and incorporated as the interstage coupling network.

With particular reference now to the drawings, Fig. 1 shows a four-terminal network 10 having the input pair of terminals 11 and the output pair of terminals 12 between which is connected an exponentially tapered ladder network comprising the shunt capacitances $C_1, C_2, \ldots C_n$ and the series inductance $L_1, L_2, \ldots L_{n-1}$. The successive shunt capacitances $C_1$, $C_2$ etc. in the forward (left to right) direction increase from section to section with a constant rate $1/a$, and the successive series inductances $L_1$, $L_2$ etc. in the forward direction from section to section decrease at the constant rate $a$, where the value of $a$ is less than unity. Thus by varying the size of the successive elements in a geometric relation as set forth, where $1/a$ is the rate of geometric progression for the capacitance values and $a$ is the rate of geometric progression for the inductance values, an exponentially tapered ladder network is formed.

As is set forth in the above-identified Pierce application, to simulate an infinite continuation of such a ladder, it is necessary to connect across the output terminals 12 a two-terminal impedance network having an admittance $$Y_t=\sqrt{\frac{C_n}{L_n}}\left[\frac{\left(a-\left(\frac{W^2-a-1}{2}\right)^2\right)^{1/2}}{W}-j\frac{(W^2-a+1)}{2W}\right]$$

where $C_n$ is the last shunt capacitance, $L_n$ is equal to $a$ times the last series inductance $L_{n-1}$, and W is a dimensionless parameter representative of frequency and is given by $\omega\sqrt{L_nC_n}$.

Examining first the reactive term of the above equation, it is found to represent the admittance of a parallel combination of a negative capacitance having a value equal to $$\frac{C_n}{2}$$

and an inductance having the value $$\frac{2a}{1-a}L_{n-1}$$

However, since the final shunt capacitance $C_n$ is presumably as small as possible already, there is no way of decreasing it still further, and it is accordingly impossible to realize such a parallel combination in a direct physical fashion.

The first problem in arriving at a terminating network which closely satisfies the desired conditions is then to achieve the admittance of this parallel combination with an equivalent configuration which is physically realizable. In Fig. 1, there is shown appended to the ladder network in expanded form a terminating network configuration which can be lumped into a physically realizable arrangement. First, there is included a series inductance $L_n$ and a shunt capacitance $C_a$, which have the values $$aL_{n-1}$$

and $$\frac{1}{a}C_n$$

respectively, corresponding to a continuation of the ladder network. This extension of the ladder an extra step has the virtue of requiring a relatively large final shunt capacitance $C_a$ whose value can be reduced if so desired. Next, there follows a parallel combination of a negative capacitance $C_b$ equal in magnitude to one half the shunt capacitance $$C_a, \text{ i. e.} -\frac{C_n}{2a}$$

and an inductance $L_b$ equal to $$\frac{2a}{1-a}$$

times the series inductance $$L_n, \text{ i. e. } \frac{2a^2}{1-a}L_{n-1}$$

Now, it is possible to achieve the effect of this negative capacitance $C_b$ merely by reducing the size of the shunt capacitance $C_a$ a corresponding amount when the expanded configuration is contracted into the form in which it will be assembled.

Examining now the real part of Equation 1 it is found to represent the image admittance of a confluent band pass wave filter. This admittance can be achieved with a shunt derived m-type half section designed to match a terminating resistance equal to the real part of Equation 1 which should be modified by a factor $a$ to compensate for the addition of the extra section comprising the series inductance $L_n$ and the shunt capacitance $C_a$. As set forth in the above-identified Pierce application, the exponentially tapered filter network will serve as a band-pass filter having a lower frequency cut-off of $$f_0(1-\sqrt{a})$$

and an upper frequency cut-off of $$f_0(1+\sqrt{a})$$

where $f_0$ is the resonant frequency of a tapered line section and is given by $$\frac{1}{2\pi\sqrt{L_1C_1}}$$

The design principles applicable are set forth in a book entitled "Transmission Networks and Wave Filters." pp. 309 et seq., by T. E. Shea, published by D. Van Nostrand Company, Incorporated, New York (1929) and are well known to workers in the electric wave filter art. In accordance with these principles, the shunt arm of the half-section comprises a parallel combination of the inductance $L_c$ and the capacitance $C_c$ and the series arm includes the parallel combination of three branch paths, one comprising the inductance $L_d$, another the capacitance $C_d$, and the last, the series combination of the inductance $L_e$ and the capacitance $C_e$. Additionally, a terminating resistance $R_1$ terminates the half-section. The values of these elements of the half-section can conveniently be expressed in terms of the inductance $L_n$ and capacitance $C_a$, the taper constant $a$, the resonant frequency of a tapered line section $f_0$, and the coefficient $m$ of the half-section, as follows:

$$L_c=\frac{2a}{m(1-a)}L_n$$

$$C_c=\frac{m}{2}C_a$$

$$L_d=\frac{m}{1-m^2}\cdot\frac{2a}{1-a}L_n$$

$$C_d=\frac{1-m^2}{2m}C_a$$

$$L_e=\frac{m}{2}L_n$$

$$C_e=\frac{2a}{m(1-a)}C_a$$

$$R_1=2\pi f_0\sqrt{a}L_n$$

In practice, it has been found advantageous to choose $m$ between .5 and .7 and preferably about .6.

In some instances, it may be desirable to modify the interstage coupling network described by utilizing the terminals 13 which are connected across the parallel combination of shunt capacitances $C_a$, $C_b$ and $C_c$ as the output terminals of the coupling network, rather than the terminals 12 across the capacitance $C_n$. In the design of a network of this kind, there is introduced a reversal of the order in which various elements are derived. In such a design, the input capacitance associated with the input circuit of the second amplifier stage to which coupling is being made serves as the sum of capacitances $C_a$, $C_b$ and $C_c$, and a lumped capacitive element serves as $C_n$.

It can be seen that in the design described the sum of $C_a$, $C_b$ and $C_c$ is equal to $$\frac{C_n}{a}\left(1+\frac{m}{2}\right)$$

Accordingly, consistent with this design, there should be chosen values of $a$ and $m$ which are convenient for the operating conditions desired and there will thereby be fixed the value of the capacitance $C_n$. This capacitance is now achieved with a lumped capacitive element. The remainder of the network then can be designed in the manner described above.

Similarly, the input capacitance of the second amplifier stage can be utilized as any one of the shunt capacitances used in the terminating network.

Fig. 2 shows, by way of example for purposes of illustration, a two stage amplifier 20 which utilizes for interstage coupling a network of the kind described in connection with Fig. 1. The tetrode V1 forms the first amplifying stage and its circuitry is of well-known form. A signal source 21 together with a coupling capacitance 22, grid-leak resistance 23 and grid bias voltage source 24 form the control-grid cathode circuit of tube V1. The cathode is operated at reference or ground potential. Plate voltage is supplied from voltage supply 25 by way of the plate load resistance 26 and screen-grid voltage is supplied from voltage supply 25 by way of the voltage dropping resistance 27.

The tetrode V2 forms the second amplifying stage and its circuitry is similarly of well-known form. Plate voltage is supplied from voltage supply 25 by way of the plate load resistance 28A and screen grid voltage is supplied from the voltage supply 25 by way of the voltage dropping resistance 28B. The cathode is operated at ground potential, and the control grid bias is provided by the voltage source 29 by way of the grid-leak resistance 30. A coupling capacitance 31 sufficiently large to have little effect on the input capacitance is connected serially in the input circuit of the tube V2.

The interstage network which applies the output voltage developed in the plate circuit of tube V1 to the input control grid circuit of tube V2 by way of the coupling capacitance 31 is of the kind described in connection with Fig. 1. The network includes an exponentially tapered ladder of shunt capacitances 32, 33, 34 and 35 and series inductances 36, 37 and 38. Of these the shunt capacitance 32 is provided by the output capacitance of the first amplifying stage and includes the plate-to-cathode capacitance of the tube V1 and various stray capacitances, such as are associated with the tube socket and connecting leads. The shunt capacitance 35 on the other hand is provided by the input capacitance of the second amplifying stage and includes the control grid-to-cathode capacitance of the tube V2 together with various stray capacitances, such as those which form part of the capacitance 32. As in the tapered ladder described above, the successive shunt capacitances in the forward direction increase at a constant rate $1/a$, while the successive series inductances in the forward direction decrease at the constant rate $a$. Additionally, in accordance with the invention, the ladder network must be specially terminated. To this end, the two-terminal terminating network comprises the series combination of the inductance 39 and the parallel combinations of various branch paths. The inductance 39 corresponds to the inductance $L_n$ of the network described above, and accordingly has a value $a$ times the series inductance 38. The first branch path comprises a capacitance 40 which represents the lumping of capacitances $C_a$, $C_b$ and $C_c$, and accordingly has a value $$\left(\frac{1+m}{2a}\right)$$

times the shunt capacitance 35. A second branch path comprises the inductance 41 which represents the lumping of inductances $L_b$ and $L_c$. The third branch path comprises the series combination of the resistance 42 which corresponds to the terminating resistance $R_1$ and the parallel combination of the capacitance 43 corresponding to $C_d$, the inductance 44 corresponding to the inductance $L_d$, and the series combination of the inductance 45 and capacitance 46, corresponding to the inductance $L_e$ and capacitance $C_e$, respectively.

Alternatively, this arrangement can be modified so that the input capacitance of the amplifying stage V2 is represented by the capacitance 40 while the capacitance 35 is a lumped capacitance. In such operation, the connection to the control grid of tetrode V2 would be made to the common terminal between inductance 39 and resistance 42.

It is to be understood that the specific embodiment described is merely illustrative of the general principles of the invention. Various modifications in the terminating network circuitry can be made by one skilled in the art without departing from the spirit and scope of the invention. Moreover, the principles of the invention are applicable to circuits utilizing special forms of amplifier tubes in which expedients are utilized to minimize stray capacitances and inductances. Additionally, it may be advantageous to utilize the various stray inductances associated with tube elements and connections thereto in forming the necessary inductances of the ladder and terminating networks.

What is claimed is:

1. In a broad band amplifier for coupling the output of a first stage to the input of a second stage, an interstage coupling network comprising an exponentially tapered ladder network including a succession of shunt capacitances and a succession of series inductances, the successive shunt capacitances increasing geometrically at the constant rate $1/a$, successive series inductances decreasing geometrically at the constant rate $a$, where $a$ is a constant value less than unity, the first shunt capacitance being the output capacitance of said first amplifying stage and the last shunt capacitance being the input capacitance of the second amplifying stage, and a terminating impedance network for the tapered ladder connected across the input of the second amplifying stage comprising a series combination of an inductance having a value $a$ times the last series inductance of the tapered ladder and a parallel combination of a plurality of impedance branch paths.

2. In a broad band amplifier for coupling the output of a first stage to the input of a second stage, an interstage coupling network comprising an exponentially tapered ladder network including a succession of shunt capacitances and a succession of series inductances, the successive shunt capacitances increasing geometrically at the constant rate $1/a$, successive series inductances decreasing geometrically at the constant rate $a$, where $a$ is a constant value less than unity, the first shunt capacitance being the output capacitance of said first amplifying stage and the last shunt capacitance being the input capacitance of the second amplifying stage, and a terminating impedance network connected across the input of the second amplifying stage comprising a series combination of an inductance having a value $a$ times the last series inductance of the tapered ladder network and a parallel combination of a plurality of impedance branch paths including one branch path having a capacitance greater than one-half the last shunt capacitance of the tapered ladder network.

3. In a broad band amplifier for coupling the output of a first stage to the input of a second stage, an interstage coupling network comprising an exponentially tapered ladder network including a succession of shunt capacitances and a succession of series inductances, the successive shunt capacitances increasing geometrically at the constant rate $1/a$, successive series inductances decreasing geometrically at the constant rate $a$, where $a$ is a constant value less than unity, the first shunt capacitance being the output capacitance of said first amplifying stage and the last shunt capacitance being the input capacitance of the second amplifying stage, and a terminating impedance network connected across the input of the second amplifying stage comprising a series combination of an inductance having a value $a$ times the last series inductance of the tapered ladder network and a parallel combination of a plurality of impedance branch paths including a first branch path having a capacitance greater than one-half the last shunt capacitance of the tapered ladder network and a second branch path having an inductance greater than $$\frac{a^2}{1-a}$$

times the last series inductance of the tapered ladder network.

4. In a broad band amplifier for coupling the output of a first stage to the input of a second stage, an interstage coupling network comprising an exponentially tapered ladder network including a succession of shunt capacitances and a succession of series inductances, the successive shunt capacitances increasing geometrically at the constant rate $1/a$, successive series inductances decreasing geometrically at the constant rate $a$, where $a$ is a constant less than unity, the first shunt capacitance being the output capacitance of said first amplifying stage and the last shunt capacitance being the input capacitance of the second amplifying stage, and a terminating impedance network connected across the input of the second amplifying stage comprising a series combination of an inductance having a value $a$ times the last series inductance of the tapered ladder network and a two-terminal network impedance branch having the impedance characteristic corresponding to that of a plurality of branch arms including one branch arm of inductance $$\frac{2a^2}{1-a}$$

times the last series inductance of the tapered ladder network, one branch arm of capacitance $1/2a$ times the last shunt capacitance of the tapered ladder network, and one branch arm being a half-section of an m-derived shunt type wave filter terminated in its free end in a matching resistance and having a transmission band approximately coinciding with that of the tapered ladder network.

5. An interstage network for coupling between two disparate capacitances comprising a tapered ladder network including a succession of shunt capacitances and series inductances, each successive series inductance having a value $a^{u-1}L$ where $n$ is the number of the particular inductance in the succession, $a$ is a constant, and L is the value of the first inductance of the succession, each successive shunt capacitance having the value $$\frac{C}{a^{n-1}}$$

where $n$ is the number of the particular capacitance in the succession and C is the value of the first shunt capacitance of the succession, and a terminating network for simulating an infinite continuation of the ladder comprising a series combination of an inductance having the value $a^nL$ and a parallel combination of a plurality of impedance branches.

6. In a broad band amplifier for coupling the output of a first stage to the input of the second stage, an interstage coupling network comprising an exponentially tapered ladder network including a succession of shunt capacitances and a succession of series inductances, each successive capacitance having a value $$\frac{C}{a^{n-1}}$$

where C is the value of the first shunt capacitance of the succession, $n$ is the number of the particular capacitance in the succession, and $a$ is a constant, each successive inductance having a value $a^{n-1}L$ where L is the value of the first inductance of the succession and $n$ is the number of the particular inductance in the succession, and a terminating impedance for the tapered ladder comprising a series combination of an inductance having a value $a$ times the last series inductance of the tapered ladder and a parallel combination of a plurality of impedance branch paths, the output capacitance of the first amplifying stage forming the first shunt capacitance of the ladder and the input capacitance of the second amplifying stage forming one of said impedance branch paths of the terminating impedance.

References Cited in the file of this patent

UNITED STATES PATENTS

| | | |
|---|---|---|
| 1,788,538 | Norton | Jan. 13, 1931 |
| 2,167,134 | Wheeler | July 25, 1939 |